April 6, 1965   R. E. BONNETTE   3,176,627
CONVEYOR SYSTEMS
Filed April 3, 1963   7 Sheets-Sheet 1

Inventor
Roland E. Bonnette
By his Attorney
Robert E. Ross

April 6, 1965

R. E. BONNETTE 3,176,627

CONVEYOR SYSTEMS

Filed April 3, 1963

United States Patent Office 3,176,627
Patented Apr. 6, 1965

3,176,627
CONVEYOR SYSTEMS
Roland E. Bonnette, Hamilton, Mass., assignor to United Shoe Machinery Corporation, Boston, Mass., a corporation of New Jersey
Filed Apr. 3, 1963, Ser. No. 270,377
5 Claims. (Cl. 104—172)

This invention relates generally to conveyors, and has particular reference to a conveyor designed for use in the manufacture of shoes, and to means for controlling the operation thereof.

In a copending application Serial No. 158,682, filed December 12, 1961 by Sidney G. Goodrich et al., now Patent No. 3,130,685, there is disclosed a conveyor system comprising a floor-mounted tow chain which is adapted to tow shoe racks from a pool position to various work stations. Means is also provided on the conveyor for releasing racks individually from the pool position, and separate means is provided at each work station for arresting a rack released from the pool position. In another copending application Serial No. 221,552, filed September 5, 1962 by J. Robbins et al., there is disclosed a novel form of rack stop mechanism which is particularly adapted for use with a conveyor of the type disclosed in the above-identified application.

The object of this invention is to provide a conveyor system of the type described having novel means for controlling the movement of article carrying devices such as shoe racks.

A further object of the invention is to provide a conveyor system of the type described in which means is provided at each stop position responsive to remote signalling means at the work station for controlling the action of stop members associated with the stop position.

A further object of the invention is to provide a conveyor control system which is actuated by remote means disposed at individual work stations.

Other objects of the invention will be apparent to one skilled in the art from the following detailed description of a specific embodiment thereof.

Figure 1:
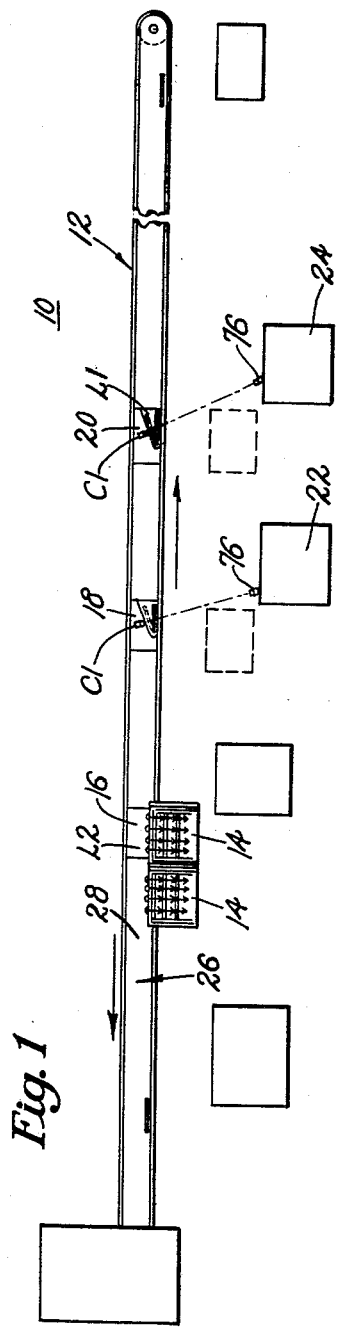
FIG. 1 is a schematic top plan view of a conveyor system embodying the features of the invention.

Referring to the drawing, there is illustrated an article handling system 10 comprising a conveyor chain 12 and a series of racks 14 adapted to be transferred by the conveyor from a pool position 16 to various stop positions, such as 18 and 20, associated with work stations 22 and 24. In the illustrated embodiment the racks 14 are designed to carry partially fabricated shoes on which predetermined operations are to be performed at the work stations. The racks are adapted to be moved manually into operative relation to the conveyor at a position upstream of the pool position, and on a predetermined signal be transported by the conveyor to a desired stop position where the rack is automatically disengaged from the chain to be subsequently removed manually from operative relation to the conveyor.

Figure 2:
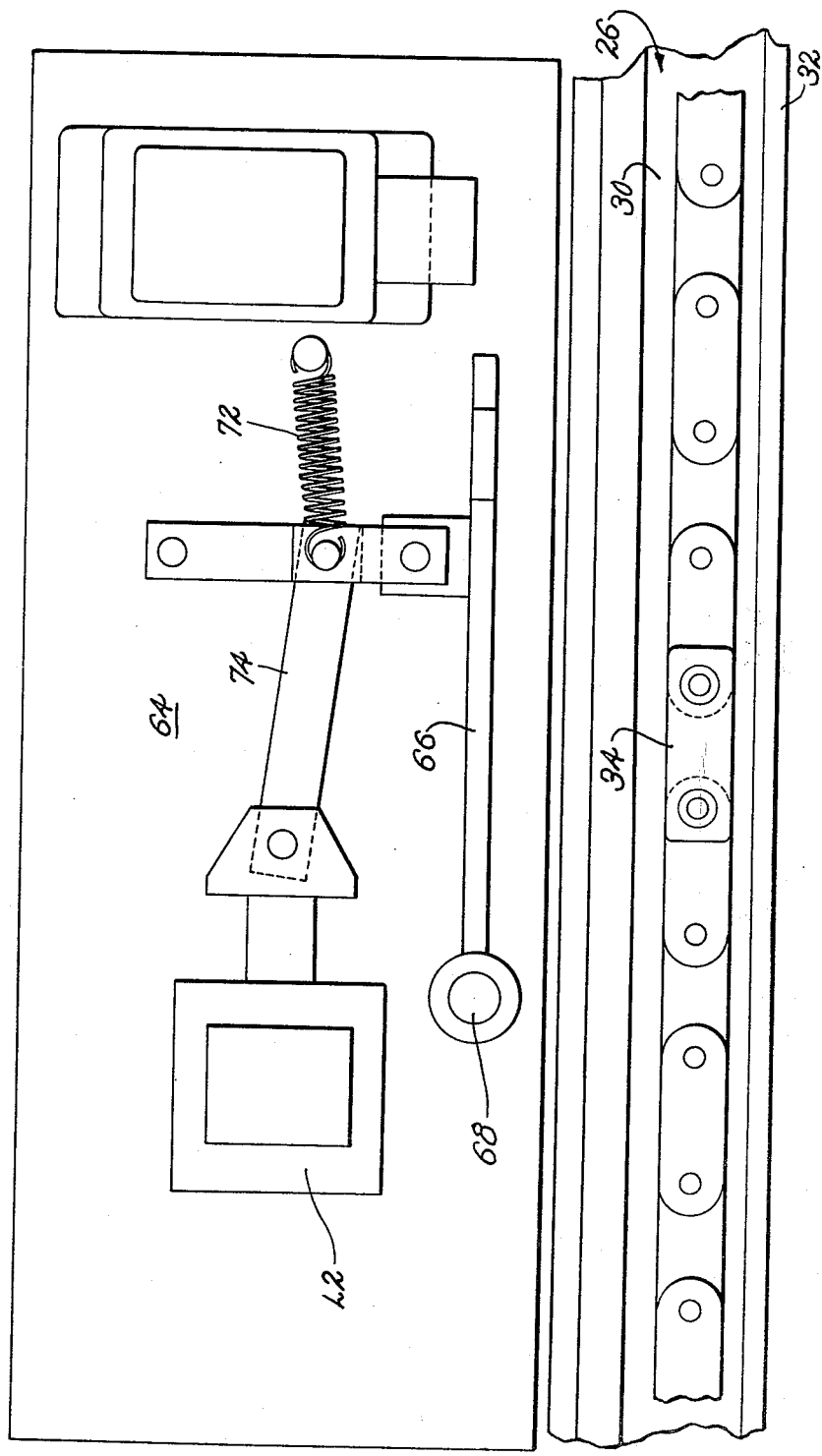
FIG. 2 is a top plan view of a stop member at a pool station disposed in the stop position.

The conveyor 12 comprises a chain support 26 which extends through the pool station 16 and the stop position, said support including a center portion 28 and a chain receiving channel 30 (FIG. 2) formed on each side thereof by an upstanding flange 32 spaced from the side wall of the center portion. The chain 12, disposed in the channels, is driven continuously at a uniform speed by any suitable means, and is provided with upwardly projecting pawls 34 for engagement with rack lock mechanisms as will appear hereinafter.

As described in the above-identified applications, the racks 14 are each provided with a towing arm 36 (FIG. 3) which is pivoted at the rear end to the rack frame and has a latch plate 38 disposed on the forward end. The latch plate is provided with a depending portion 40 adapted for engagement by a chain pawl 34 when the arm is in the lowered position, a laterally projecting portion 42 for engagement with stop mechanisms in a manner to appear hereinafter, and an inclined portion 44 extending between the laterally extending portion 42 and the depending portion 40 to enable the latch plate to cam itself over the flange 32 when the rack is moved sideways into operative relation to the tow chain.

Figure 4:
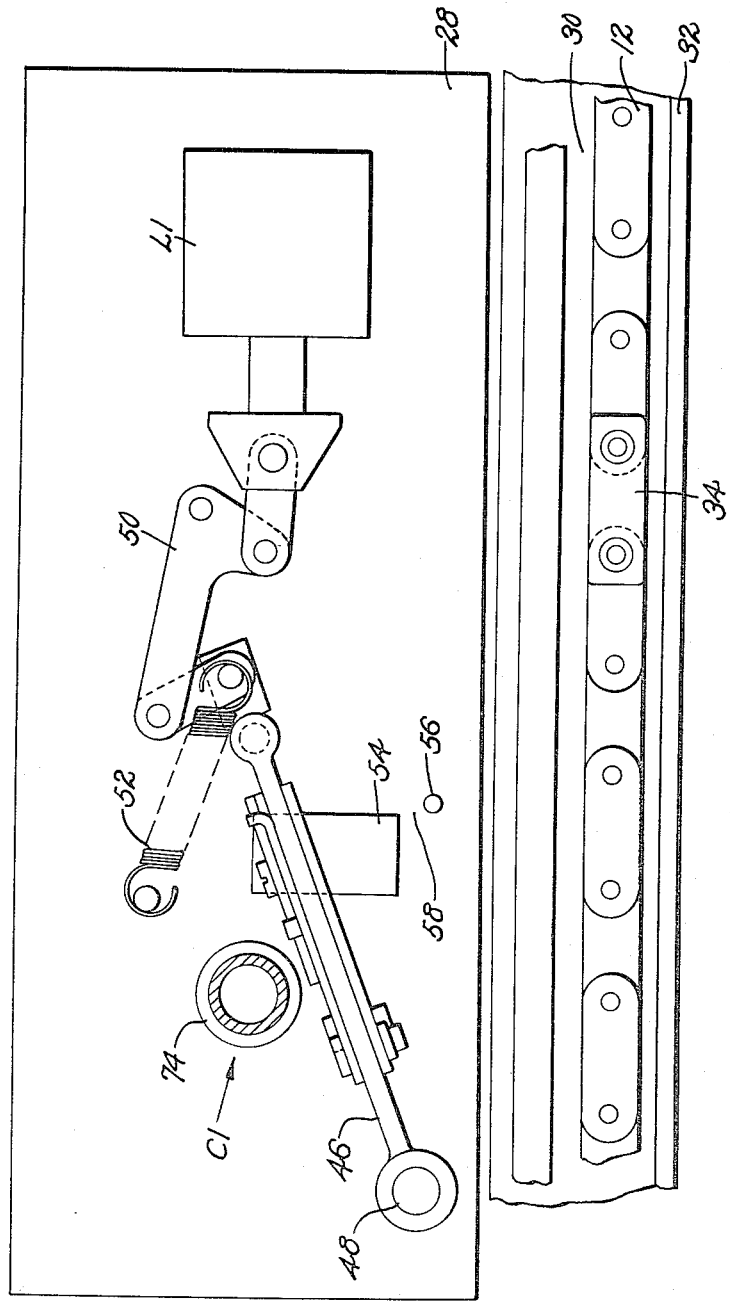
FIG. 4 is a top plan view of a stop member disposed at a stop position associated with a work station downstream of the pool position, with the stop member being disposed in the pass position.
Figure 5:
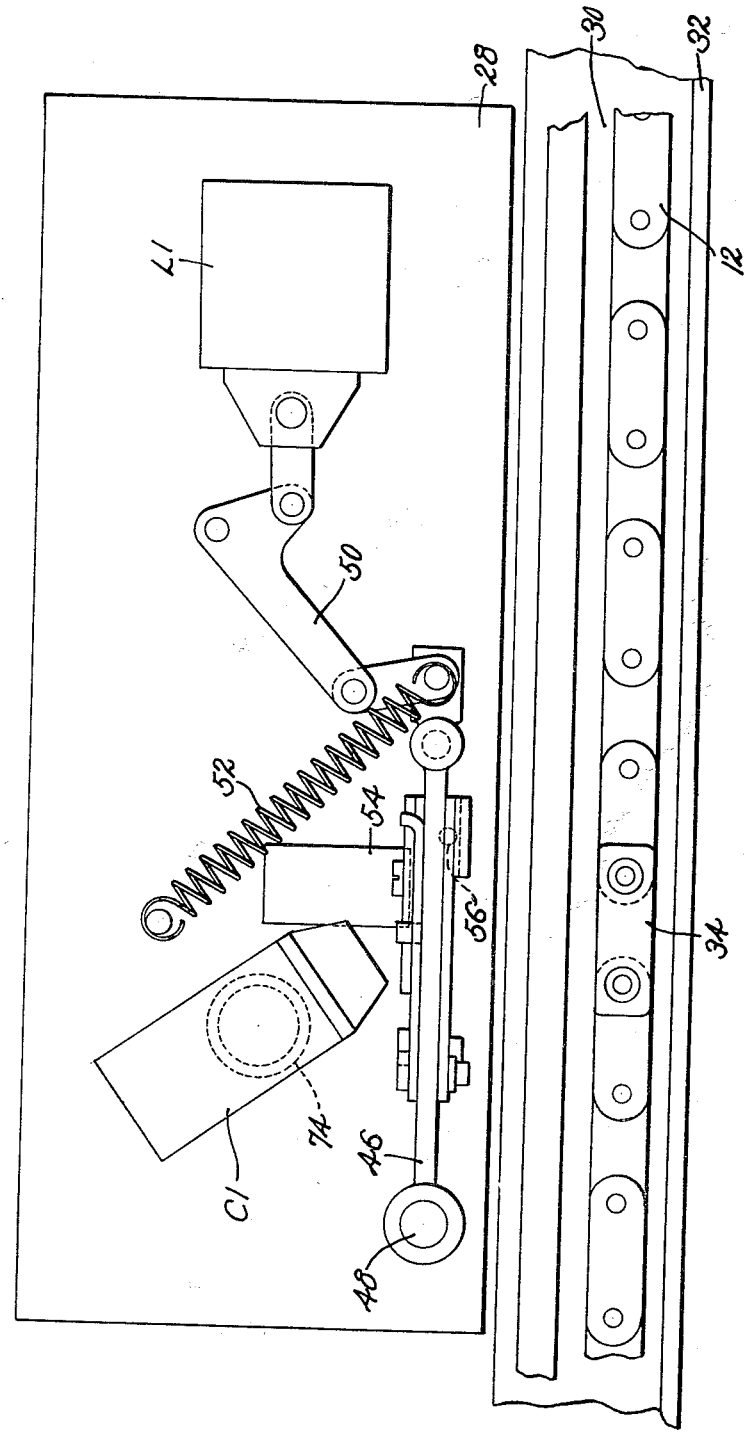
FIG. 5 is a top plan view of the stop member of FIG. 4 with the stop member being disposed in the stop position.
Figure 6:
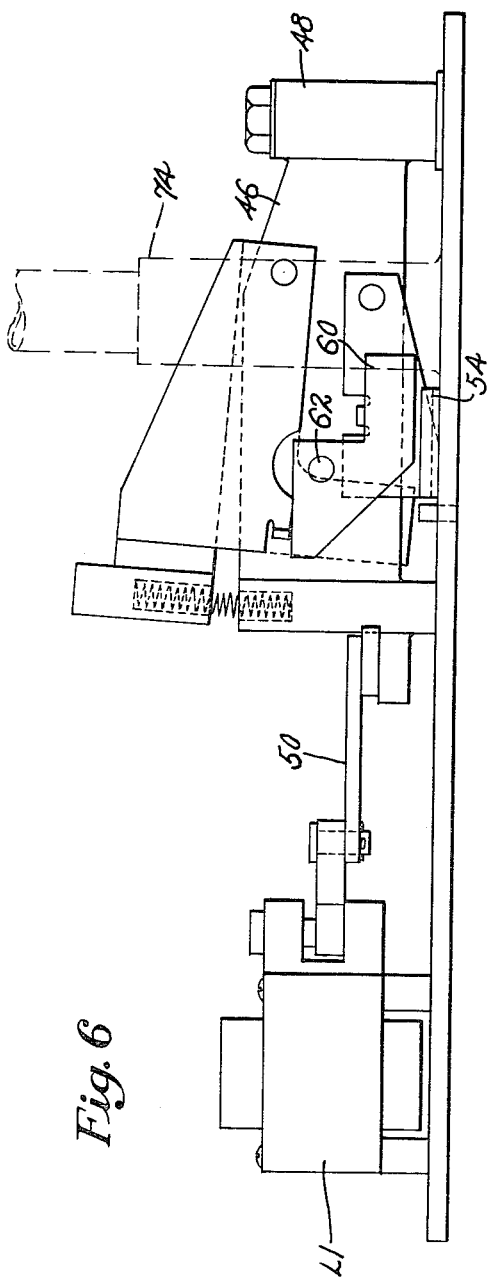
FIG. 6 is a view in side elevation of the stop member of FIG. 5.
Figure 7:
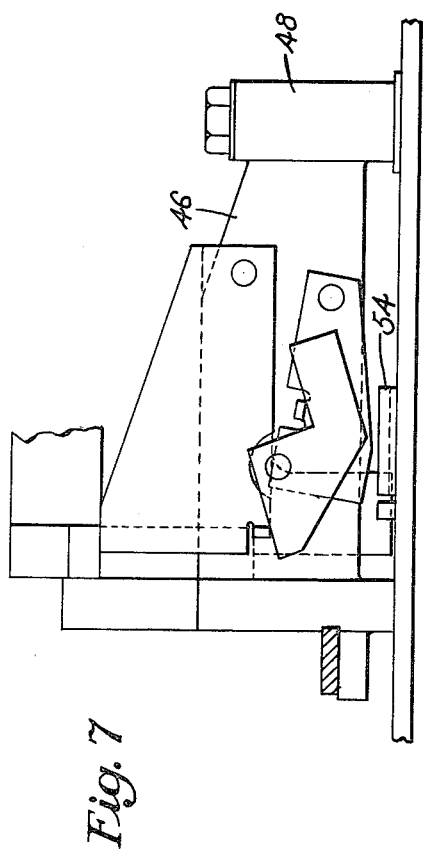
FIG. 7 and 8 are views of a portion of the stop member of FIG. 6 after it has arrested an article carrying device.
Figure 8:
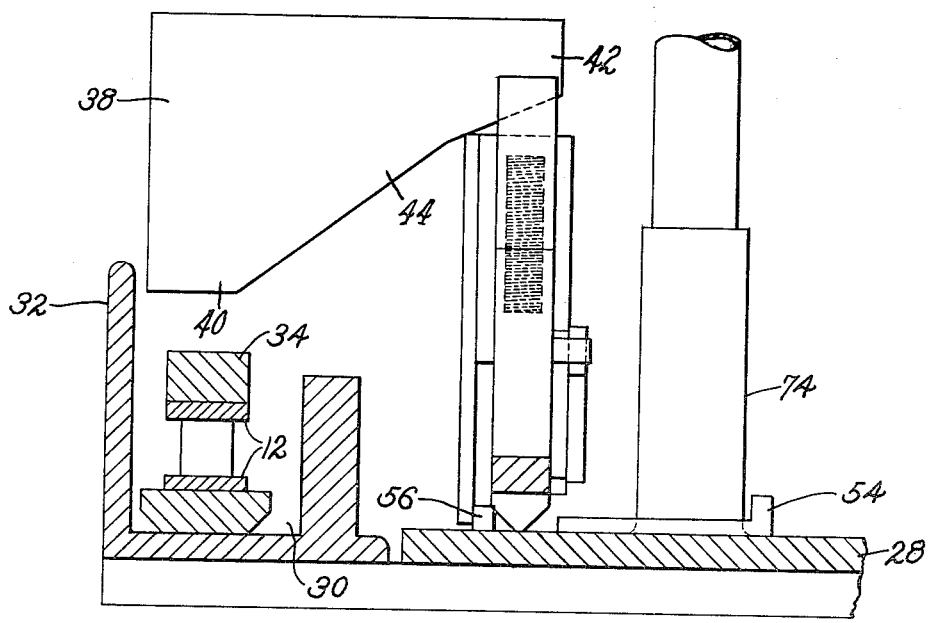

As described in the above-identified application Serial No. 221,552, the stop mechanisms at the work station stop positions each comprises a support arm 46 pivoted at 48 for horizontal swinging movement between a pass position (see FIG. 4) in which the arm is swung away from the chain so that a rack being towed by the chain is permitted to pass the stop position without engagement of the latch plate on the rack with the stop mechanism, and a stop position (see FIGS. 5–7) in which the arm is swung into parallel relation to the chain to arrest the movement of a rack by disengaging the latch plate from the chain.

In the illustrated embodiment the stop mechanism may be moved from the pass position to the stop position by means of a solenoid L1 acting through a suitable linkage 50. The arm is normally maintained in the pass position by a spring 52. Means is also provided for latching the stop member in the stop position after actuation of the solenoid, so that when the solenoid is de-energized the stop member is retained in the stop position, and for this purpose a plate 54 is disposed under the forward end of the arm, said plate terminating in spaced relation to a stop block 56. A latch arm 60 is provided on the support arm 46 pivoted thereto at 62, so that the forward end thereof rests on the plate 54 when the stop member is in the pass position, and latches behind stop block 56 (FIG. 4) when the stop member moves to the stop position, to retain said member in the stop position against the force of the spring 52.

Figure 3:
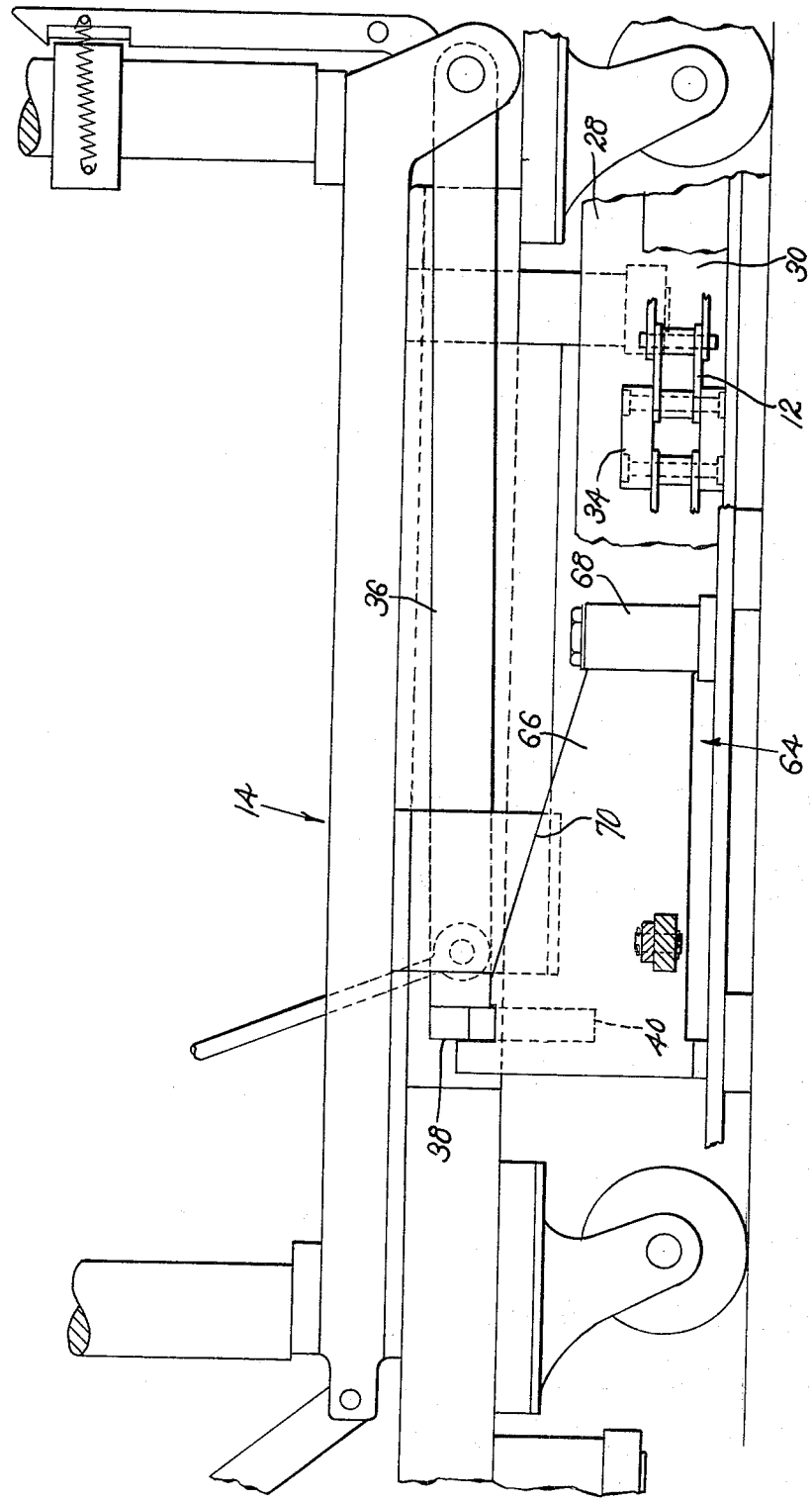
FIG. 3 is a view in side elevation of the stop member of FIG. 2, with an article carrying device arrested by the stop member.

The stop mechanism 64 at the pool position 16 comprises a support arm 66 (FIG. 2) pivoted at 68 for horizontal swinging movement between a pass position in which the arm is swung away from the chain, and a stop position in which the arm is disposed generally parallel to the rack. The upper surface 70 of the arm 66 is inclined upwardly to lift the latch plate 38 out of engagement with the chain when the arm is in the stop position (FIG. 3).

In the illustrated embodiment the arm is normally maintained in the stop position by means of spring 72 and may be moved to the pass position by means of a solenoid L2 acting through a suitable linkage 74. Since in normal operation it is only necessary that the pool stop be moved to the pass position for a time long enough for one rack to be released from the pool, no means for latching the pool stop in the pass position is provided.

In a conveyor system of the type described, it is necessary that the operator at each work station have means for releasing a rack from the pool position into engagement with the conveyor and for causing it to stop at the stop position adjacent his work station. Since the path of travel of the racks is between the work stations and the stop members, it has been found inconvenient to provide wiring therebetween to enable the operator at the work station to actuate the stop mechanisms. Such wiring must be either buried in the floor which is expensive and often undesirable, or must be passed overhead, which is unsightly and also expensive if the wires are to be properly protected against physical damage.

Hence, there is provided at each stop position on the conveyor a photo-responsive device C–1 which in the illustrated embodiment is a photo-resistive cell, suitably mounted on a pedestal 74 to receive and respond to a light beam. The actuating light beam may be projected from a suitable light source 76 mounted at the work station, with said light source being energized from either the power source or from a machine at the work station from batteries, through any convenient operator controlled switch means.

Figure 9:
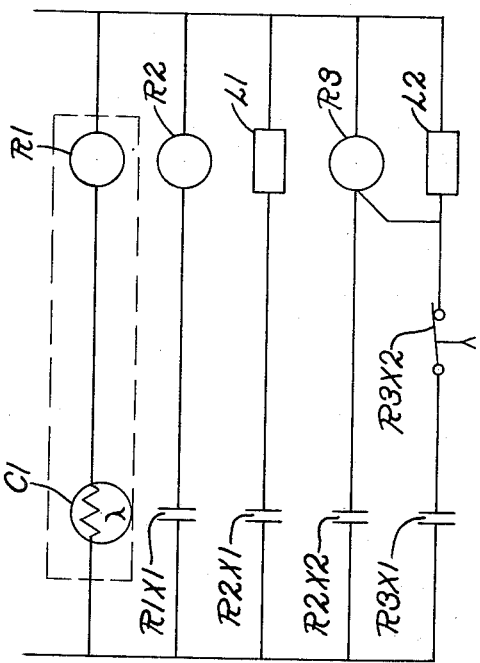
FIG. 9 is a schematic diagram of the electrical circuit for controlling the operation of the conveyor system.

Referring now to FIG. 9 there is illustrated a schematic diagram of the control circuit of the conveyor, which operates in a manner now to be described.

When an operator at a work station requires a new rack of work, he energizes the light source 76. The impingement of the light source into the photo-cell C–1 reduces the resistance thereof to an amount such that relay R1 is energized, thereby closing contact R1X1 and energizing relay R2. Relay R2 closes contacts R2X1 thereby actuating solenoid L1 to move the work station stop from the pass position to the stop position, and also closes contacts R2X2 which actuates timing relay R3. The energization of relay R3 closes contacts R3X1, thereby actuating solenoid L2 to move the pool stop from the stop position to the pass position, so that the latch of the first rack at the pool stop drops into engagement with the chain and is conveyed away from the pool station toward the work station. After a predetermined short interval of time, sufficient to permit the rack to clear the pool stop, contacts R3X2 of the timing relay R3 open thereby de-energizing solenoid L2 and permitting the stop mechanism 64 to return to the stop position, thereby preventing any of the following racks from travelling beyond the pool stop. In the meantime, the operator has de-energized the light source so that the photo-cell resistance has returned to its original value. Relay R1 is thereby de-energized, opening contacts R1X1, thereby den-energizing relay R2 and opening contacts R2X1 and R2X2. The circuit to the pool stop relay R3 is thereby broken, and also the circuit to the work station stop solenoid L1 so that the entire control is returned to its original position. However, the de-energization of solenoid L1 does not permit the work station stop to return to the pass position, because of the previously described latching mechanism. After the released rack has been arrested by the work station stop mechanism, the operator removes the rack from the operative relation to the chain and transfers it to a position convenient to the work station.

Since certain obvious changes may be made in the above illustrated embodiment of the invention, it is intended that all matter contained herein be interpreted in an illustrative and not a limiting sense.

Having thus described my invention, what I claim as new and desire to secure by Letters Patent of the United States is:

1. A conveyor system, comprising conveying means adapted to transfer article carrying devices between work stations, stop means associated with the conveying means, said stop means being shiftable between a stop position in which an article carrying device is arrested when it reaches the stop member and a pass position in which the article carrying device is not arrested, a photo-responsive device associated with each stop means, means actuatable by the photo-responsive device to cause the stop means associated therewith to shift from one of said positions to the other, and photo-responsive device activating means associated with each work station.

2. A conveyor system as set forth in claim 1 in which said means actuatable by said photo-responsive device is adapted, on actuation, to cause the associated stop means to move to the stop position and to cause an upstream stop means to move to the pass position.

3. A conveyor system, comprising conveying means adapted to transfer article carrying devices between stop positions associated with work stations disposed alongside the conveying means, stop means at each stop position which is shiftable between a stop position in which an article carrying device is arrested when it reaches the stop position and a pass position in which the article carrying device is not arrested, a photo-responsive device associated with each stop means, and a photo-responsive device actuating means disposed at each work station, means responsive to the actuation of a photo-responsive device to cause the associated stop member to shift to the stop position and to cause an upstream stop member to shift to the pass position.

4. A conveyor system as set forth in claim 3 in which the actuation of said photo-responsive device causes the associated stop member to latch in the stop position and causes the upstream stop member to move momentarily to the pass position and return to the stop position.

5. A conveyor system of the type described comprising conveying means having a pool position and stop positions disposed downstream thereof associated with work stations disposed along side the conveying means, stop means disposed at said pool position actuatable to release article carrying devices therefrom one at a time, and stop means disposed at each stop position shiftable between a pass position and a stop position, photo-responsive means associated with each stop position, and a light source associated with each work station, means responsive to the actuation of a photo-responsive device by the light source at the associated work station to cause the stop means at said work station to shift to the stop position and to actuate the stop means at the pool position to release a single article carrying device.

References Cited by the Examiner
UNITED STATES PATENTS

| | | | |
|---|---|---|---|
| 1,144,374 | 6/15 | Nolan | 104—253 |
| 1,672,364 | 6/28 | Brown | 104—253 |
| 1,846,032 | 2/32 | Hart | 246—30 |
| 1,917,837 | 7/33 | Haddlesay | 104—104 |
| 2,188,293 | 1/40 | Williams | 246—29X |
| 2,529,804 | 11/50 | Harnischfeger et al. | |
| 2,572,011 | 10/51 | Cohen. | |
| 2,619,916 | 12/52 | Rainier | 104—172 |
| 2,885,969 | 5/59 | Kay et al. | 104—172 |

LEO QUACKENBUSH, *Primary Examiner.*